(12) United States Patent
Nagaoka et al.

(10) Patent No.: US 10,465,581 B2
(45) Date of Patent: Nov. 5, 2019

(54) INTERNAL COMBUSTION ENGINE AND METHOD FOR REMOVING PARTICULATE SUBSTANCE FROM INTERNAL COMBUSTION ENGINE

(71) Applicant: ISUZU MOTORS LIMITED, Tokyo (JP)

(72) Inventors: Daiji Nagaoka, Kamakura (JP); Masashi Gabe, Tama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 78 days.

(21) Appl. No.: 15/525,705

(22) PCT Filed: Nov. 6, 2015

(86) PCT No.: PCT/JP2015/081323
§ 371 (c)(1),
(2) Date: May 10, 2017

(87) PCT Pub. No.: WO2016/076226
PCT Pub. Date: May 19, 2016

(65) Prior Publication Data
US 2018/0163588 A1    Jun. 14, 2018

(30) Foreign Application Priority Data
Nov. 12, 2014   (JP) .................. 2014-229849

(51) Int. Cl.
*F01N 3/02* (2006.01)
*F01N 3/10* (2006.01)
(Continued)

(52) U.S. Cl.
CPC .............. *F01N 3/20* (2013.01); *F01N 3/0293* (2013.01); *F01N 3/035* (2013.01); *F01N 3/103* (2013.01);
(Continued)

(58) Field of Classification Search
CPC ...... F01N 3/2066; F01N 3/021; F01N 3/0222; F01N 3/0293; F01N 3/035; F01N 3/103;
(Continued)

(56) References Cited

U.S. PATENT DOCUMENTS 4,631,076 A    12/1986   Kurihara et al.
2008/0098727 A1   5/2008   Driscoll et al.
(Continued)

FOREIGN PATENT DOCUMENTS

CN   103547774 A   1/2014
EP      188267 A1   7/1986
(Continued)

OTHER PUBLICATIONS

Machine Translation FR 2865239 Done Aug. 21, 2018.*
(Continued)

*Primary Examiner* — Patrick D Maines
*Assistant Examiner* — Dapinder Singh
(74) *Attorney, Agent, or Firm* — Procopio, Cory, Hargreaves & Savitch LLP (57) ABSTRACT

A spray device 40 sprays a liquid oxidation catalyst 41 into an interior of an upstream small-diameter pipe 32 which is disposed upstream of an oxidation catalyst 25, so that the liquid oxidation catalyst 41 is supplied to particulate matters which have accumulated on an upstream end face 31 of the oxidation catalyst 25 and a diametrically expanded pipe 33 which is disposed upstream of the upstream end face 31 to thereby oxidize and remove the accumulated particulate matters by a catalytic action of the supplied liquid oxidation catalyst 41, whereby it becomes possible to remove the particulate matters which have accumulated on the upper end face 31 of the oxidation catalyst 25 which is disposed in
(Continued)

an exhaust passageway and a portion of the exhaust passageway which is situated upstream of the upstream end face 31.

6 Claims, 3 Drawing Sheets (51) Int. Cl.
*F01N 3/20* (2006.01)
*F01N 9/00* (2006.01)
*F01N 13/00* (2010.01)
*F01N 3/029* (2006.01)
*F01N 3/035* (2006.01)
*F01N 3/24* (2006.01)
*F01N 3/021* (2006.01)

(52) U.S. Cl.
CPC .............. *F01N 3/206* (2013.01); *F01N 3/24* (2013.01); *F01N 9/00* (2013.01); *F01N 9/002* (2013.01); *F01N 13/009* (2014.06); F01N 3/021 (2013.01); F01N 2260/04 (2013.01); F01N 2260/06 (2013.01); F01N 2560/08 (2013.01); F01N 2610/01 (2013.01); F01N 2610/102 (2013.01); F01N 2610/1406 (2013.01); F01N 2610/1433 (2013.01); F01N 2900/1404 (2013.01); F01N 2900/1411 (2013.01); Y02T 10/47 (2013.01)

(58) Field of Classification Search
CPC ... F01N 3/20; F01N 3/206; F01N 3/24; F01N 13/009; F01N 9/00; F01N 2240/20; F01N 2900/1404; F01N 2900/1411; F01N 2260/04; F01N 2260/06; F01N 2610/01; F01N 2610/102; F01N 2610/1406; F01N 2610/1433; F01N 2610/02; B01J 2523/00; B01J 2523/13
USPC ........... 60/286, 295, 299–301, 297, 311, 274
See application file for complete search history.

(56) References Cited

U.S. PATENT DOCUMENTS

| | | | |
|---|---|---|---|
| 2009/0056319 A1* | 3/2009 | Warner | B01D 53/90 60/299 |
| 2009/0084094 A1* | 4/2009 | Goss | B01F 3/04049 60/301 |
| 2009/0208393 A1* | 8/2009 | Wenzel | F01N 3/0222 423/213.2 |
| 2010/0132341 A1 | 6/2010 | Stefanick et al. | |
| 2012/0110990 A1* | 5/2012 | Stein | F01N 3/2066 60/317 |
| 2013/0306028 A1* | 11/2013 | Monsallier | C10L 1/02 123/434 |
| 2014/0000246 A1 | 1/2014 | Hosoya et al. | |

FOREIGN PATENT DOCUMENTS

| | | |
|---|---|---|
| FR | 2859240 A1 | 3/2005 |
| FR | 2865239 A1 | 7/2005 |
| JP | S57-030521 A | 2/1982 |
| JP | S57-030522 A | 2/1982 |
| JP | S57-030523 A | 2/1982 |
| JP | S60-122214 A | 6/1985 |
| JP | S62-060913 A | 3/1987 |
| JP | S63-212713 A | 9/1988 |
| JP | 2004-257267 A | 9/2004 |
| JP | 2010-043577 A | 2/2010 |

OTHER PUBLICATIONS

International Search Report and Written Opinion for PCT App No. PCT/JP2015/081323 dated Jan. 12, 2016 8 pgs.
Extended European Search Report for EP App No. 15859011.7 dated Mar. 28, 2018, 7 pgs.
First Office Action for related CN App No. 201580060966.7 dated Oct. 19, 2018, 14 pages.

* cited by examiner

INTERNAL COMBUSTION ENGINE AND METHOD FOR REMOVING PARTICULATE SUBSTANCE FROM INTERNAL COMBUSTION ENGINE

CROSS-REFERENCE TO RELATED APPLICATIONS

This application is a U.S. National Stage entry of PCT Application No. PCT/JP2015/081323, filed on Nov. 6, 2015, which claims priority to Japanese Patent Application No. 2014-229849, filed Nov. 12, 2014, the contents of which are incorporated herein by reference.

TECHNICAL FIELD

The present invention relates to an internal combustion engine and a method for removing particulate matter by the internal combustion engine particulate matter removing method, and more specifically, to an internal combustion engine which removes particulate matter accumulated on an upstream end face of an oxidation catalyst that is disposed on an exhaust passageway and on the exhaust passageway at a portion upstream of the upstream end face and a method for removing particulate matter by the internal combustion engine.

BACKGROUND ART

In diesel engines, in order to trap particulate matters in exhaust gas discharged from cylinder and to burn and remove the particulate matters, an oxidation catalyst and a trapping device, which traps the particulate matters in the exhaust gas, are disposed in an exhaust passageway.

In those engines, when the temperature of an exhaust passageway is kept low for many hours as a result of the engine being kept running under low load for many hours, particulate matters accumulate upstream of an upstream end face of the oxidation catalyst, or more specifically, on the upstream end face of the oxidation catalyst and an inner wall of a diametrically expanded pipe which is expanded diametrically from a downstream end of an upstream small-diameter pipe and where the flow velocity of exhaust gas drops. In addition, in raising the temperature of exhaust gas by the oxidation catalyst by supplying unburned fuel into the exhaust passageway to forcibly burn and remove the particulate matters that have accumulated on the trapping device, when the unhurried fuel is not sprayed uniformly or when the temperature of the exhaust passageway is low, the unburned fuel adheres to a portion of the exhaust passageway which is situated further upstream of the upstream end face of the oxidation catalyst. The unburned fuel so accumulating is then subjected to a roasted condition as a result of the engine being run thereafter to grow into particulate matters which accumulate as described above.

In this respect, there has been proposed an apparatus for removing the matter that has accumulated on an oxidation catalyst by raising the temperature of exhaust gas on an upstream side of the oxidation catalyst, as described in JP-A-2004-257267 (PTL 1), for example.

However, since no catalyst exists on the piping laid out upstream of the upstream end face of the oxidation catalyst, if a great amount of particulate matters accumulate on such a place, it is not possible to burn and remove the particulate matters forcibly.

Thus, when a great amount of particulate matters accumulate, the exhaust passageway has to be disassembled and opened to clean and remove the accumulated particulate matters mechanically. However, such a cleaning and removal work involves disassembling and opening the exhaust passageway where the particulate matters accumulate, so that there may be a fear that the particulate matters are scattered.

CITATION LIST

Patent Literature

PTL 1: JP-A-2004-257267

SUMMARY OF INVENTION

Technical Problem

The invention has been made in view of the problem described above, and a problem that the invention is to solve is to provide an internal combustion engine and a method for removing particulate matter by an internal combustion engine which removes particulate matter accumulated on an upstream end face of an oxidation catalyst that is disposed on an exhaust passageway and on the exhaust passageway at a portion upstream of the upstream end face.

Solution to Problem

An internal combustion engine of the invention designed to solve the problem is an internal combustion engine, in which an oxidation catalyst and a trapping device for trapping particulate matter contained in exhaust gas are disposed sequentially in this order from an upstream side in an exhaust passageway through which the exhaust gas passes, wherein a spray device is provided or temporarily provided upstream of the oxidation catalyst, and wherein the internal combustion engine is configured to: control the spray device to spray a liquid oxidation catalyst into an interior of a portion of the exhaust passageway upstream of the oxidation catalyst so as to supply the liquid oxidation catalyst to the particulate matter which accumulates on an upstream end face of the oxidation catalyst and on a portion of the exhaust passageway upstream of the upstream end face; and oxidize and remove the accumulated particulate matter by a catalytic action of the supplied liquid oxidation catalyst.

Additionally, an internal combustion engine particulate matter removing method of the invention designed to solve the problem is a method for removing particulate matter by an internal combustion engine, in which an oxidation catalyst and a trapping device for trapping particulate matter contained in exhaust gas are disposed sequentially in this order, the method being for removing the particulate matter which accumulates on an upstream end face of the oxidation catalyst and on a portion of the exhaust passageway upstream of the upstream end face, comprising: spraying a liquid oxidation catalyst into an interior of the portion of the exhaust passageway upstream of the oxidation catalyst so as to supply the liquid oxidation catalyst to the particulate matter which accumulates on the upstream end face and the portion of the exhaust passageway upstream of the upstream end face; and oxidizing and removing the accumulated particulate matter by making use of a catalytic action of the liquid oxidation catalyst when a temperature of exhaust gas which passes through the exhaust passageway becomes equal to or higher than a predetermined temperature.

When referred to herein, the liquid oxidation catalyst means a liquid oxidation catalyst which is made by adding an oxide-based catalyst to a liquid. For example, a liquid catalyst in which a cerium oxide which is a rare earth metal oxide is added to a liquid can exemplify the liquid oxidation catalyst described above.

Advantageous Effect of Invention

According to the internal combustion engine and the internal combustion engine particulate matter removing method of the invention, the liquid oxidation catalyst is sprayed into the interior of the portion of the exhaust passageway which is situated upstream of the oxidation catalyst, so that the liquid oxidation catalyst is supplied to the particulate matter which has accumulated on the upstream end face of the oxidation catalyst and the portion of the exhaust passageway which is situated upstream of the upstream end face, whereby the accumulated particulate matter that has so accumulated is oxidized and removed by the catalytic action of the liquid oxidation catalyst.

Since this obviates the necessity of disassembling the exhaust passageway to gain access to the interior thereof so as to clear away and remove the accumulated particulate matter, the particulate matter is prevented from being scattered when the particulate matter is cleared away and removed. Additionally, it can prevent the deterioration of fuel economy which is attributed to tin increase in exhaust pressure which would otherwise be triggered by the accumulation of the particulate matters. Further, since the particulate matters are burned and removed at a normal temperature of the exhaust gas by an oxidization action of the liquid oxidation catalyst, the oxidation catalyst and the trapping device can be restrained from being deteriorated by heat.

DESCRIPTION OF EMBODIMENTS

Figure 1:
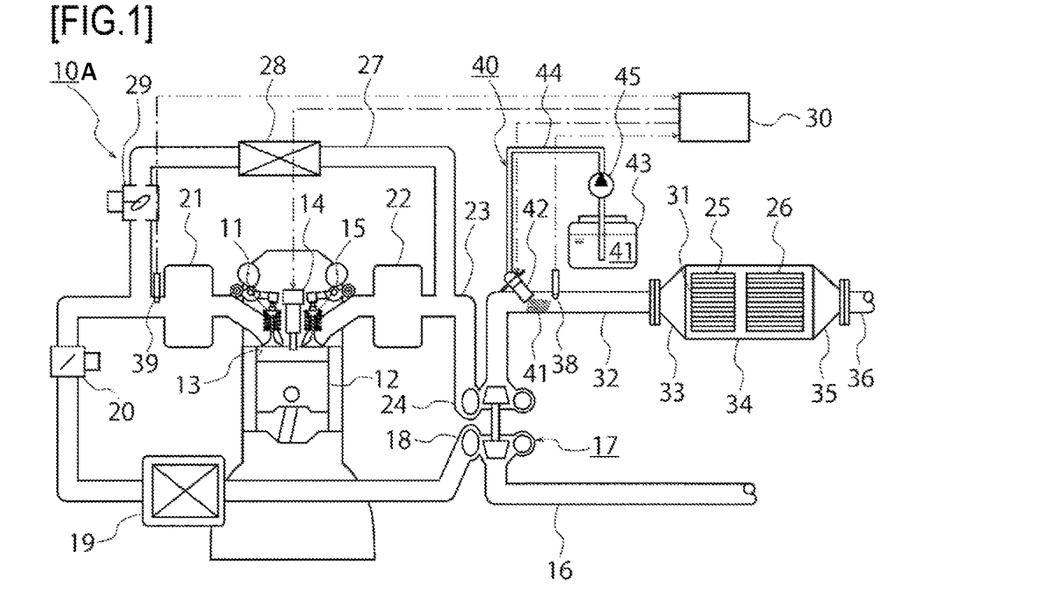
FIG. 1 is an explanatory drawing which illustrates a first embodiment of an internal combustion engine of the invention.
Figure 2:
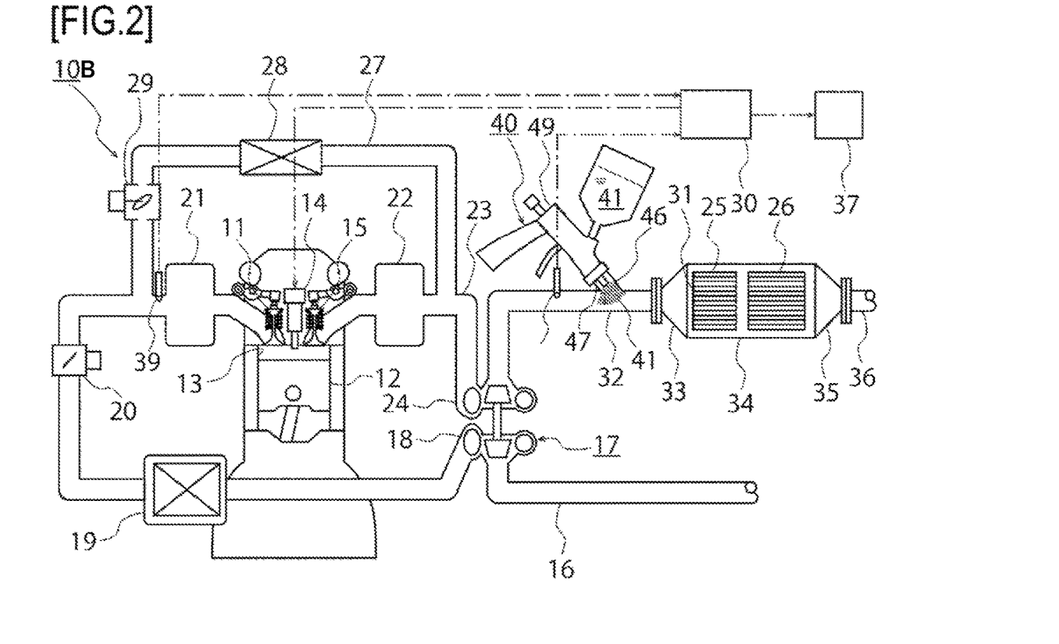
FIG. 2 is an explanatory drawing which illustrates a second embodiment of an internal combustion engine of the invention.

Hereinafter, embodiments of an internal combustion engine and an internal combustion engine particulate matter removing method of the invention will be described. FIG. 1 shows the configuration of a diesel engine (hereinafter, referred to as an engine) 10A according to a first embodiment of the invention. FIG. 2 shows the configuration of an engine 10B according to a second embodiment of the invention.

In these engines 10A and 10B, during driving or the like, intake air taken into a cylinder 13 in which a piston 12 reciprocates from an intake valve 11 and fuel injected into the cylinder 13 from a fuel injection valve 14 are mixed together to be burned, and gas produced as a result of the combustion is discharged from an exhaust valve 15 as exhaust gas.

Intake air is taken into an intake passageway 16 from outside, is then compressed to high temperatures by a compressor 18 of a turbocharger 17 and is cooled by an inter-cooler 19. Thereafter, the flow rate of intake air is controlled by an intake throttle 20 and is taken into the cylinder 13 from the intake valve 11 by way of an intake manifold 21.

Exhaust gas is discharged from the cylinder 13 into an exhaust manifold 22 by way of the exhaust valve 15 and are then discharged therefrom into an exhaust passageway 23 to drive a turbine 24 of the turbocharger 17. Thereafter, the exhaust gas is purified by an oxidation catalyst 25 and a trapping device 26, which are disposed sequentially in that order from an upstream side, and are then emitted to the atmosphere. A urea injection valve and an SCR catalyst may be disposed sequentially in that order downstream of the trapping device 26, so that oxide of nitrogen in the exhaust gas is reduced by the SCR catalyst through an SCR reaction using ammonia as a reducing agent.

Part of exhaust gas makes up an EGR gas and is cooled by an EGR cooler 28 provided on an EGR passageway 27 which branches off from the exhaust passageway 23 to be connected to the intake passageway 16, thereafter being supplied into the intake passageway 16 by an EGR valve 29 to be mixed into intake air.

In relation to an exhaust emission control in this engine 10A, unburned hydrocarbon and carbon monoxide in the exhaust gas are oxidized by the oxidation catalyst 25, and nitrogen monoxide is also oxidized by the oxidation catalyst 25 to thereby produce nitrogen dioxide. Additionally, the nitrogen monoxide is oxidized by a catalyst loaded in the trapping device 26 to thereby produce nitrogen dioxide, and particulate matters in exhaust gas are trapped by the trapping device 26. Trapped particulate matters react with produced nitrogen dioxides in the trapping device 26, whereby the particulate matters are oxidized and removed.

On the other hand, when particulate matters accumulate in the trapping device 26, a control unit 30 controls the fuel injection valve 14 to execute a post injection in which an injection timing at which fuel is injected into the cylinder 13 is delayed to thereby supply unburned fuel into the exhaust passageway 23. Then, the temperature of the exhaust gas is raised by the unburned fuel in the oxidation catalyst 25, and the particulate matters which have accumulated in the trapping device 26 are forcibly burned and removed therein. A configuration may be adopted in which an injection valve for injecting unburned fuel, directly into the exhaust passageway 23 is provided somewhere on the exhaust passageway 23 downstream of the turbine 24 and upstream of the catalyst 25 so that unburned fuel is supplied directly into tire exhaust passageway 23 in place of execution of the post injection.

However, in a case where the temperature of the exhaust passageway 23 is kept low for many hours as a result of the engine being kept running under low load for many hours, or in a case where unburned fuel is not sprayed uniformly when supplying unburned fuel into the exhaust passageway 23 or the temperature of the exhaust passageway 23 is low, particulate matters accumulate on an upstream end face 31 of the oxidation catalyst 25 and a portion of the exhaust passageway 23 which is situated further upstream of the upstream-side end face 31.

This state will be described in detail. A portion of the exhaust passageway 23 which is situated downstream of the turbine 24 is made up of an upstream small-diameter pipe 32, a diametrically expanded pipe 33 which is expanded diametrically towards a downstream end thereof, a large-diameter pipe 34 in an interior of which the oxidation catalyst 25 and the trapping device 26 are disposed sequentially in that order from an upstream end thereof, a diametrically contracted pipe 35 which is diametrically contracted towards a downstream end thereof, and a downstream small-diameter pipe 36. The oxidation catalyst 25 disposed in the interior of the large-diameter pipe 34 is made by coating a honeycomb structure of ceramic or the like with a noble metallic catalyst such as platinum or palladium.

When the engine is kept running under low load for many hours, particulate matters accumulate on the upstream end face 31 of the oxidation catalyst 25. Additionally, when unburned fuel is supplied, unburned fuel which adheres to the upstream end face 31 is subjected to a roasted condition as a result of the engine being run thereafter to grow into particulate matters which accumulate as described above. Then, as a result of the accumulation of particulate matters on the upstream end face 31, particulate matters existing in exhaust gas do not pass through the oxidation catalyst 25 but accumulate on the upstream end face 31 and an inner wall of the diametrically expanded pipe 33 where the flow velocity of exhaust gas drops drastically. No catalyst exists at a location which lies away from the upstream end face 31 and on the inner wall of the diametrically expanded pipe 33.

Then, a liquid oxidation catalyst 41 is sprayed into an interior of the upstream small-diameter pipe 32 which is disposed upstream of the oxidation catalyst 25 by a spray device 40 which is provided on the upstream small-diameter pipe 32 in the engine 10A of the invention and by a spray device 40 which is provided temporarily on the upstream small-diameter pipe 32 in the engine 10B of the invention so as to be supplied to the particulate matters which accumulate on the upstream end face 31 of the oxidation catalyst 25 and in the diametrically expanded pipe 33 which is disposed further upstream than the upstream end face 31, whereby the accumulated particulate matters are oxidized and removed by a catalytic action of the supplied liquid oxidation catalyst 41.

The spray device 40 can exemplifies a spray device for spraying the liquid oxidation catalyst 41 into the interior of the upstream small-diameter pipe 32 which is disposed downstream of the turbine 24 and upstream of the oxidation catalyst 25. For example, the spray device 40 shown in FIG. 1 is a device which is provided on the upstream small-diameter pipe 32 of the engine 10A, and the spray device 40 shown in FIG. 2 is a device which is installed in a service shop where vehicles are serviced and which is temporarily set on the upstream small-diameter pipe 32 of the engine 10B.

The engine 10A of the first embodiment shown in FIG. 1 utilizes a spray valve 42, as the spray device 40, which is provided on the upstream small-diameter pipe 32 so as to spray the liquid oxidation catalyst 41 directly into the interior of the upstream small-diameter pipe 32. Additionally, the engine 10A includes a storage tank 43 for storing the liquid oxidation catalyst 41, a connection line 44 which connects the spray valve 42 with the storage tank 43, and a delivery pump 45 which is provided somewhere along the connection line 44. The spray valve 42 is controlled by the control unit 30. An electric pump should be used for the delivery-pump 45.

A boss portion 46 is joined to the upstream small-diameter pipe 32 of the exhaust passageway 23 of the engine 10B of the second embodiment shown in FIG. 2 so as to project outwards of the upstream small-diameter pipe 32. A spray port 47 is formed on the boss portion 46. Then, a spray device 49 is used as the spray device 40, and this spray device 49 has a spray nozzle 48 which is provided temporarily so as to be inserted into and dislocated from the spray port 47.

A flat pattern, a full cone pattern, a hollow cone pattern and the like can exemplify spray patterns of the liquid oxidation catalyst 41 which is sprayed from the spray valve 42 or the spray nozzle 48. In a case where a spray valve for spraying unburned fuel is disposed on the exhaust passageway 23, the spraying position of the spray device 40 is preferably situated upstream of the spray valve.

The liquid oxidation catalyst 41 is a catalyst which is made up of a liquid which contains an oxide based catalyst containing a mixture of an oxygen containing component and an oxidizing metallic component. Iron oxide and cerium oxide are used as oxidation catalysts, and for example, a fuel borne catalyst (FBC) in which cerium oxide which is a rare earth metal oxide is added to a liquid can be used for the liquid oxidation catalyst. This liquid oxidation catalyst 41 oxidizes and removes the particulate matters by making use of a catalytic action.

This liquid oxidation catalyst 41 promotes the oxidation and removal of accumulated particulate matters when the temperature of the exhaust gas reaches a combustion removal temperature T1 which is relatively low as an exhaust gas temperature which can be reached during a normal operation of the engines 10A and 10B. This oxidation removal temperature T1 is 450 degrees or higher unless a liquid oxidation catalyst is used, whereas the oxidation removal temperature T1 is 300 degrees or higher when a liquid oxidation catalyst is used.

The operation of the engine 10A shown in FIG. 1 will be described. When it is determined that particulate matters accumulate on the upstream end face 31 of the oxidation catalyst 25 and the inner wall of the diametrically expanded pipe 33, the control unit 30 controls the spray valve 42 so that the liquid catalyst 41 is sprayed from the spray valve 42 into the interior of the upstream small-diameter pipe 32 to be supplied sufficiently to the particulate matters which accumulate on the upstream end face 31 of the oxidation catalyst 25 and the inner wall of the diametrically expanded pipe 33.

Then, during a normal operation of the engine 10A, when the temperature of the exhaust gas which pass through the upstream small-diameter pipe 32 reaches the predetermined oxidation removal temperature T1 or higher, the accumulated particulate matters are oxidized and removed by a catalytic action of the liquid oxidation catalyst 41.

The operation of the engine 10B shown in FIG. 2 will be described. When it is determined that particulate matters accumulate on the upstream end face 31 of the oxidation catalyst 25 and the inner wall of the diametrically expanded pipe 33, the control unit 30 controls a warning device 37 so that the warning device 37 is illuminated or expels a warning sound to inform the driver of the accumulation of particulate matters.

Next, the driver drives the vehicle to a service shop, where a lid, not shown, is opened to open the spray port 47 of the boss portion 46. Next, the driver inserts the spray nozzle 48 of the spray device 49 installed in the service shop into to the spray port 47 and then pulls a trigger of the spray device 49 so as to spray the liquid oxidation catalyst 41 from the spray nozzle 48 into the interior of the upstream small-diameter pipe 32, thereby supplying a sufficient amount of liquid oxidation catalyst 41 to the particulate matters that have accumulated on the upstream end face 31 of the oxidation catalyst 25 and the inner wall of the diametrically expanded pipe 33. Incidentally, in a case where the liquid oxidation catalyst 41 is sprayed from the spray device 49, the engine 10B should preferably be idled.

The driver draws the spray nozzle 48 out of the spray port 47 after the sufficient amount of liquid oxidation catalyst 41 has been supplied to the accumulated particulate matters and then shuts the lid to close the spray port 47. Then, during a normal operation of the engine 10B when the temperature of the exhaust gas which passes through the upstream small-diameter pipe 32 reaches the predetermined oxidation removal temperature T1 or higher, the accumulated particulate matters are oxidized and removed by a catalytic action of the liquid oxidation catalyst 41.

According to the engines 10A and 10B described above, the liquid oxidation catalyst 41 is sprayed directly into the interior of the upstream small-diameter pipe 32, so that the liquid oxidation catalyst 41 is supplied to the particulate matters which have accumulated on the upstream end face 31 of the oxidation catalyst 25 and on the inner wall of the diametrically expanded pipe 33 which is disposed upstream of the upstream end face 31, whereby the accumulated particulate matters are oxidized and removed by she catalytic action of the liquid oxidation catalyst 41.

Since this obviates the necessity of disassembling the diametrically expanded pipe 33 to gain access to the interior thereof so as to clear away and remove the accumulated particulate matters, the particulate matters are prevented from being scattered when they are cleared away and removed.

Additionally, it can prevent the deterioration of fuel economy which is attributed to an increase in exhaust pressure which would otherwise be triggered by the accumulation of the particulate matters. Further, since the accumulated particulate matters are oxidized and removed by a catalytic action of the liquid oxidation catalyst 41 at the temperature of the exhaust gas that can be reached during normal driving, the oxidation catalyst 25 and the trapping device 26 can be restrained from being deteriorated by heat that would be produced at higher temperatures.

In a case where the spray valve 42 is provided on the upstream small-diameter pipe 32 of the engine 10A as the spray device 40, since the exhaust pressure is reduced by oxidizing and removing the particulate matters that have accumulated on the upstream end face 31 of the oxidation catalyst 25 and the inner wall of the diametrically expanded pipe 33 while the vehicle is being driven, it is advantageous in improving fuel economy.

On the other hand, in a case where the spray nozzle 48 of the spray device 49 which is installed in the service shop is set temporarily on the upstream small-diameter pipe 32 as the spray device 40, since the spray device 40 is not installed on the engine 10B, the increase in weight and size of the engine 10B is suppressed when compared with the engine 10A. Additionally, since only the boss portion 46 having the spray port 47 should be provided on the upstream small-diameter pipe 32, this technique can also be applied to engines mounted on vehicles which have already been on the markets.

In the engines 10A and 10B, it should be determined whether or not particulate matters have accumulated in the above-described way before the liquid oxidation catalyst 41 is sprayed from the spray device 40.

For such a determination to be made, it is preferable to adopt a configuration in which a pressure sensor 38 is provided on the upstream small-diameter pipe 32 as a pressure acquiring device for acquiring an exhaust pressure P1, the control unit 30 determines whether or not the exhaust pressure P1 which is acquired by the pressure sensor 38 is equal to or greater than an accumulated pressure Pa which is preset or greater, and in case it is determined that the exhaust pressure P1 is equal to or greater than the accumulated pressure Pa, it is preferable to determine that particulate matters have accumulated.

The accumulated pressure Pa is set at a value based on which it can be determined that the exhaust pressure is increased to such an extent that the fuel economy is badly affected by the accumulation of particulate matters. This accumulated pressure Pa is set based on a flow rate Qa of the exhaust gas discharged from the cylinder 13.

When particulate matters accumulate on the upstream end face 31 of the oxidation catalyst 25 and the inner wall of the diametrically expanded pipe 33, the exhaust pressure P1 downstream of the turbine 24 is increased. Then, the pressure sensor 38 is provided on the upstream small-diameter pipe 32 to determine on an increase in exhaust pressure P1.

According thereto, in the case of the engine 10A, the liquid oxidation catalyst 41 can be sprayed when particulate matters have accumulated. In the case of the engine 10B, the control unit 30 activates the warming device 37 to inform the driver of the accumulation of particulate matters.

It is preferable to configure such that the accumulated pressure Pa is set by reference to an accumulated pressure map M1 stored in the control unit 30.

Figure 3:
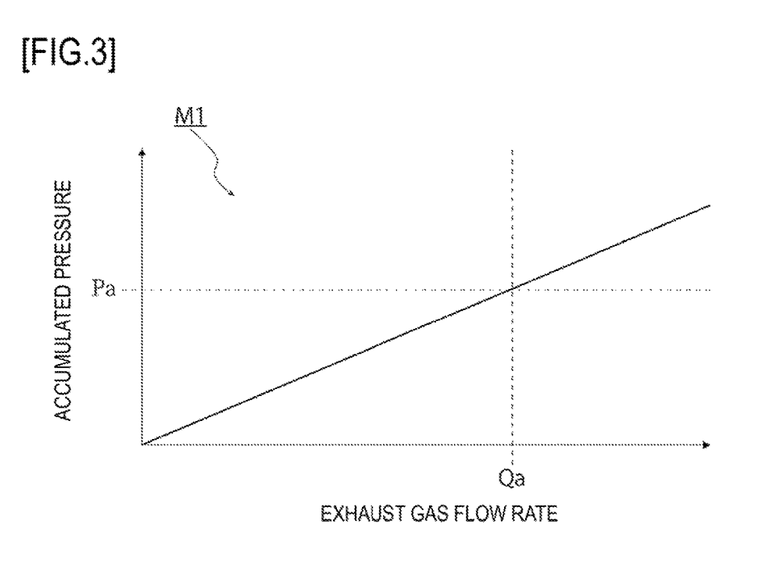
FIG. 3 is an accumulated pressure map stored in control units shown in FIGS. 1 and 2 in which accumulated pressures based on flow rates of exhaust gas are set.

As shown in FIG. 3, the accumulated pressure map M1 is a map in which the accumulated pressure Pa is set based on the flow rate Qa of the exhaust gas discharged from the cylinder 13. This accumulated pressure map M1 is prepared through experiments and tests for storage in the control unit 30.

The accumulated pressure Pa should be set so as to increase in proportion to the flow rate Qa of the exhaust gas discharged from the cylinder 13. When the flow rate Qa of the exhaust gas increases, a exhaust pressure P1 which is acquired by the pressure sensor 38 increases accordingly. Then, the control unit 30 has the accumulated pressure map M1 shown in FIG. 3 and can determine on an accumulation of particulate matters accurately by utilizing the accumulated pressure Pa which is set by reference to the pressure accumulated map M1.

Figure 4:
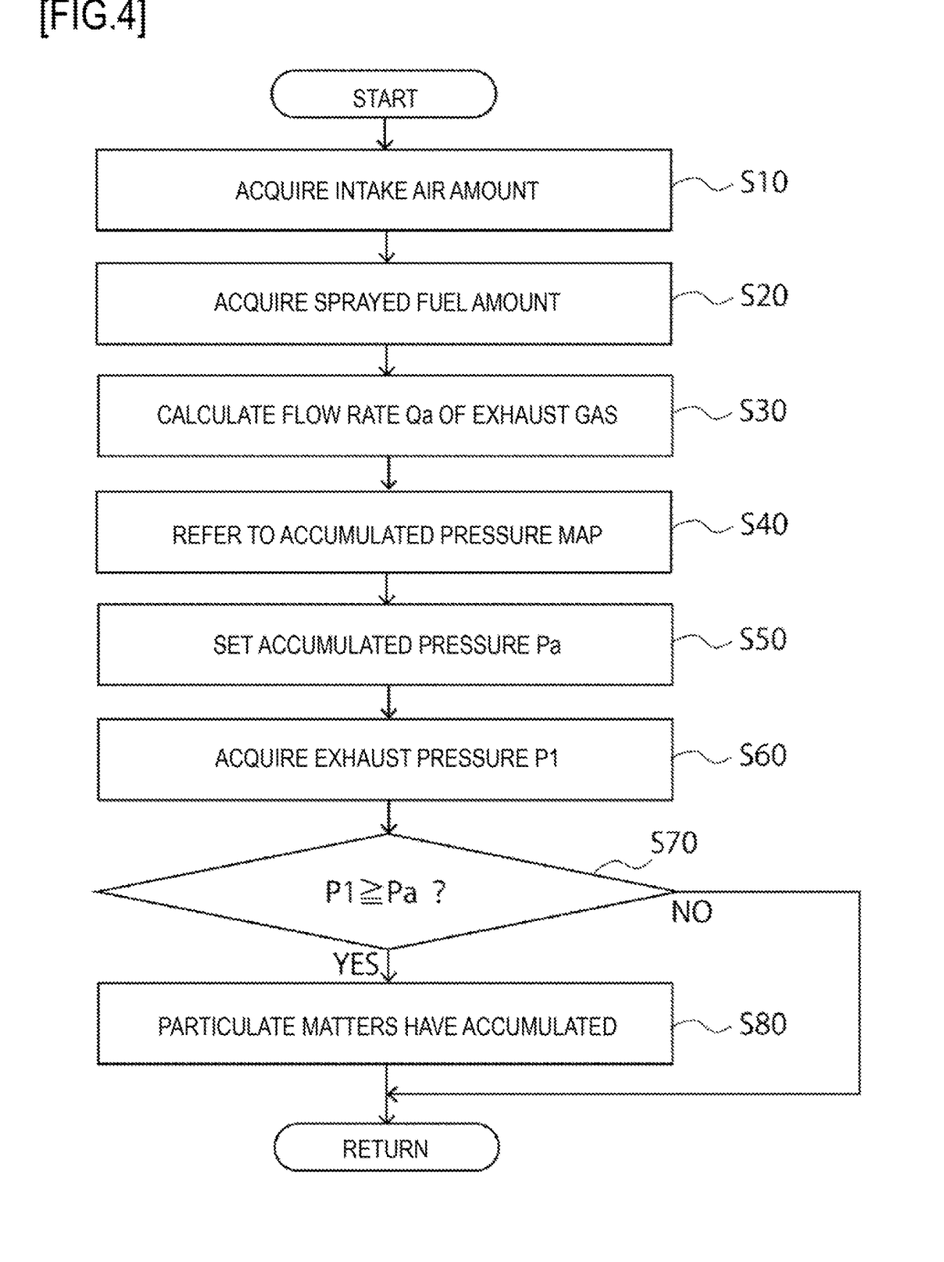
FIG. 4 is a flow chart illustrating a determination made by the control units shown in FIGS. 1 and 2.

A method of determining whether or not particulate matters have accumulated through the determination described above will be described by reference to a flow chart shown in FIG. 4.

Firstly, a step S10 is executed where the control unit 30 acquires an intake air amount Q1 from a detection value of an intake air amount sensor 39. Following this, a step S20 is executed where the control unit 30 acquires a sprayed fuel amount Q2 which is an amount of fuel sprayed from the fuel spray valve 14. Next, a step S30 is executed where the control unit 30 calculates a flow rate Qa of the exhaust gas based on the intake air amount Q1 and the sprayed fuel amount Q2. In this step S30, the calculation is carried out by using a flow rate map in which flow rates of exhaust gas are set based on intake air mounts and sprayed fuel amounts which are stored in advance in the control unit 30. These steps S10 to S30 are not limited to those described above, provided that the flow rate Qa of the exhaust gas can be calculated. For example, a flow rate of exhaust gas may be calculated based on the running state of the engine 10A and the sprayed fuel amount.

Next, a step S40 is executed where the control unit 30 refers to the accumulated pressure map M1. Following this, a step S50 is executed where an accumulated pressure Pa is set based on the flow rate Qa of the exhaust gas which is calculated by the control unit 30 in step S30. Next, a step S60 is executed where the control unit 30 acquires an exhaust pressure P1 from a detection value of the pressure sensor 38.

Next, a step S70 is executed where the control unit 30 determines whether or not the exhaust pressure P1 acquired in the step S60 is equal to or greater than the accumulated pressure Pa which is set in the step S50. If it is determined in step S70 that the exhaust pressure P1 is smaller than the accumulated pressure Pa, the determination method returns to start. On the other hand, if it is determined in the step S70 that the exhaust pressure P1 is equal to or greater than the accumulated pressure Pa, the control unit 30 executes a step S80 where the control unit 30 determines that particulate matters have accumulated on the upstream end face 31 of the oxidation catalyst 25 and the inner wall of the diametrically expanded pipe 33, whereby the determination method completes.

In the case of the engine 10A of the first embodiment, after the above-described method has completed, if it is determined that particulate matters have accumulated, the control unit 30 controls the spray valve 42 that is provided on the upstream small-diameter pipe 32 so as to start spraying the liquid oxidation catalyst 41. On the other hand, in the case of the engine 10B of the second embodiment, after the above-described method has completed, if it is determined that particulate matters have accumulated, the control unit 30 controls the warning device 37 so as to issue a warning to the driver. On being given the warning, the driver brings the vehicle to the service shop, and the driver operates the spray device 49 so that the liquid oxidation catalyst 41 is sprayed from the spray nozzle 48 that is provided temporarily on the upstream small-diameter pipe 32.

The spray amount of the liquid oxidation catalyst 41 is preferably such an amount that a sufficient amount of liquid oxidation catalyst 41 is supplied to the particulate matters which have accumulated on the upstream end face 31 of the oxidation catalyst 25 and the inner wall of the diametrically expanded pipe 33. For example, when a great difference exists between the exhaust pressure P1 and the accumulated pressure Pa, the spray amount should be increased.

REFERENCE SIGNS LIST 10A, 10B Engine
17 Turbocharger
23 Exhaust passageway
24 Turbine
25 Oxidation catalyst
26 Trapping device
31 Upstream end face
32 Upstream small-diameter pipe
33 Diametrically expanded pipe
37 Waring device
38 Pressure sensor
39 Intake air amount sensor
40 Spray device
41 Liquid oxidation catalyst
42 Spray vale
43 Storage tank
44 Connection line
45 Delivery pump
46 Boss portion
47 Spray port
48 Spray nozzle
49 Spray device
M1 Accumulated pressure map
P1 Exhaust pressure
Pa Accumulated pressure
Qa Flow rate
T1 Combustion removal temperature

The invention claimed is:

1. An internal combustion engine, comprising:
an oxidation catalyst and a particulate filter that traps particulate matter contained in exhaust gas, wherein the oxidation catalyst and particulate filter are disposed sequentially in this order from an upstream side in an exhaust passageway through which the exhaust gas passes,
a sprayer is provided or temporarily provided upstream of the oxidation catalyst, a boss portion including a spray port provided on the exhaust passageway at a portion upstream of the oxidation catalyst,
wherein the internal combustion engine further comprises an electronic control unit (ECU) which is configured to:
control the sprayer to spray a liquid oxidation catalyst into an interior of a portion of the exhaust passageway upstream of the oxidation catalyst so as to supply the liquid oxidation catalyst to the particulate matter which accumulates on an upstream end face of the oxidation catalyst and on a portion of the exhaust passageway upstream of the upstream end face; and
oxidize and remove the accumulated particulate matter by a catalytic action of the supplied liquid oxidation catalyst,
wherein when the ECU determines that there is accumulated particulate matter on the upstream end face of the oxidation catalyst and on the portion of the exhaust passageway upstream of the upstream end face, a spray nozzle is provided temporarily by being removably inserted into the spray port of the boss portion of the exhaust passageway as the sprayer, so as to temporarily supply the liquid oxidation catalyst to the accumulated particulate matter.

2. The internal combustion engine according to claim 1, further comprising a pressure sensor for acquiring an exhaust pressure in the portion of the exhaust passageway upstream of the oxidation catalyst,
wherein the ECU is configured to, when the exhaust pressure becomes a preset accumulated pressure or greater, determine that the particulate matter has accumulated on the upstream end face and the portion of the exhaust passageway upstream of the upstream end face, and control the sprayer to spray the liquid oxidation catalyst.

3. The internal combustion engine according to claim 2, wherein the accumulated pressure is set by reference to an accumulated pressure map in which the accumulated pressure is set based on a flow rate of the exhaust gas discharged into the exhaust passageway.

4. The internal combustion engine according to claim 1, wherein the oxidization and removal of the accumulated particulate matter occurs at a temperature of 300 degrees or higher.

5. A method for removing particulate matter by an internal combustion engine, in which an oxidation catalyst and a particulate matter filter that traps particulate matter contained in exhaust gas are disposed sequentially in this order, the method being for removing the particulate matter which accumulates on an upstream end face of the oxidation catalyst and on a portion of the exhaust passageway upstream of the upstream end face, the method comprising:
when an electronic control unit (ECU) determines that there is accumulated particulate matter on the upstream end face of the oxidation catalyst and on the portion of the exhaust passageway upstream of the upstream end face, spraying a liquid oxidation catalyst into an interior of the portion of the exhaust passageway upstream of the oxidation catalyst using a spray nozzle which is provided temporarily by being removably inserted into a boss portion including a spray port provided on the exhaust passageway at a portion upstream of the oxidation catalyst, so as to supply the liquid oxidation catalyst to the particulate matter which accumulates on the upstream end face and the portion of the exhaust passageway upstream of the upstream end face; and oxidizing and removing the accumulated particulate matter by making use of a catalytic action of the liquid oxidation catalyst when a temperature of the exhaust gas which passes through the exhaust passageway becomes equal to or higher than a predetermined temperature.

6. The method for removing particulate matter by an internal combustion engine according to claim 5, wherein the oxidization and removal of the accumulated particulate matter occurs at a temperature of 300 degrees or higher.

\* \* \* \* \*